United States Patent
Baumgartner et al.

(10) Patent No.: US 7,228,946 B2
(45) Date of Patent: Jun. 12, 2007

(54) BRAKE DISC FOR A DISC BRAKE

(75) Inventors: Johann Baumgartner, Moosburg (DE); Dieter Bieker, Oberaudorf (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 40 days.

(21) Appl. No.: 10/491,430

(22) PCT Filed: Oct. 1, 2002

(86) PCT No.: PCT/EP02/11000

§ 371 (c)(1),
(2), (4) Date: Sep. 30, 2004

(87) PCT Pub. No.: WO03/031839

PCT Pub. Date: Apr. 17, 2003

(65) Prior Publication Data

US 2005/0029060 A1    Feb. 10, 2005

(30) Foreign Application Priority Data

Oct. 2, 2001    (DE) ............................... 101 48 681

(51) Int. Cl.
*F16D 65/12* (2006.01)
(52) U.S. Cl. ............................ 188/218 XI; 188/18 A
(58) Field of Classification Search ......... 188/218 XL, 188/18 A
See application file for complete search history.

(56) References Cited

U.S. PATENT DOCUMENTS

| 2,753,032 | A | * | 7/1956 | Eason ................... 192/113.23 |
|---|---|---|---|---|
| 2,753,959 | A | * | 7/1956 | Johnson ................ 188/218 XL |
| 3,187,851 | A | * | 6/1965 | Dean .................... 188/218 XL |
| 3,209,876 | A | * | 10/1965 | Kraft ..................... 192/107 R |
| 3,747,731 | A |   | 7/1973 | Smirl |
| 3,773,153 | A | * | 11/1973 | Smirl ................... 188/218 XL |
| 4,132,294 | A | * | 1/1979 | Poli ...................... 188/218 XL |
| 4,273,218 | A |   | 6/1981 | Morris et al. |
| 4,448,291 | A | * | 5/1984 | Ritsema et al. ........ 188/218 XL |
| 4,501,346 | A | * | 2/1985 | Bogenschutz ......... 188/218 XL |
| 4,597,486 | A | * | 7/1986 | Kabayama .............. 192/107 R |
| 4,613,021 | A | * | 9/1986 | Lacombe et al. ..... 188/218 XL |
| 4,757,883 | A | * | 7/1988 | Thiel et al. ........... 188/218 XL |
| 4,928,798 | A | * | 5/1990 | Watson et al. ........ 188/218 XL |
| 5,107,966 | A | * | 4/1992 | Metzler et al. ........ 188/251 M |
| 5,109,960 | A | * | 5/1992 | Gunther ................ 188/218 XL |
| 5,164,652 | A | * | 11/1992 | Johnson et al. ............. 320/106 |
| 5,862,892 | A | * | 1/1999 | Conley ................. 188/218 XL |

(Continued)

FOREIGN PATENT DOCUMENTS

DE          591 787          1/1934

(Continued)

*Primary Examiner*—Robert A. Siconolfi
(74) *Attorney, Agent, or Firm*—Crowell & Moring LLP

(57) ABSTRACT

The invention relates to a brake disk for a disk brake, in particular for utility vehicles. Said brake disk comprises two spaced friction rings, which are linked to each other forming an air space and is linked to a wheel hub and/or axle in a rotationally fixed manner. Said brake disk is designed, such that it is fixed to the hub, by means of a separate link piece radially extending, in a manner that said disk can be elastically displaced in the hub axial direction.

37 Claims, 5 Drawing Sheets

U.S. PATENT DOCUMENTS 6,152,270 A * 11/2000 Giorgetti ............... 188/218 XL
6,164,423 A * 12/2000 Dickerson ............. 188/218 XL
6,241,055 B1 * 6/2001 Daudi ..................... 188/73.35
6,267,209 B1 * 7/2001 Gross et al. .......... 188/218 XL
6,808,050 B2 * 10/2004 Lehmann et al. ..... 188/218 XL

FOREIGN PATENT DOCUMENTS

| | | |
|---|---|---|
| DE | 591787 | 1/1934 |
| DE | 2254653 | 8/1973 |
| DE | 38 14 680 A1 | 11/1989 |
| DE | 198 10 685 C1 | 11/1999 |
| EP | 0 364 620 A1 | 4/1990 |
| FR | 2807485 | 10/2001 |
| GB | 2013804 A | 8/1979 |

* cited by examiner

BRAKE DISC FOR A DISC BRAKE

BACKGROUND AND SUMMARY OF THE INVENTION

The present invention relates to a brake disk for a disk brake and, in particular, for a disk brake for utility vehicles.

Disk brakes for vehicles are known, for example, as sliding-caliper disk brakes, swivelling-caliper disk brakes or fixed-caliper disk brakes. In the utility vehicle field, particularly the sliding-caliper brake has become a successful standard design, in which case the sliding caliper is displaceably disposed on a brake anchor plate rigidly fastened to the wheel axle. Sliding-caliper or swivelling-caliper disk brakes require a component—the brake anchor plate—which is fixed to the axle and which, when the brake is operated, absorbs the circumferential forces of the brake linings with the brake pads. Also, the brake anchor plate holds the caliper, which is slidably or swivellably disposed with respect to the vehicle axle.

If a fixed caliper is used instead of a sliding caliper, the brake disk may be designed as a sliding disk, which is axially displaceably disposed on the wheel axle. During brakings, it is first contacted by a brake pad and then pushed against the brake pad arranged on the opposite side of the brake disk. In this case, generally, the generating of force—that is, the brake application device—and a wear adjusting device are arranged on one side of the brake disk. As the wear increases, the brake disk is also slowly axially slid on the wheel axle in order to compensate the wear of the brake pad.

The relative movement, which the sliding disk therefore has to bridge, can be divided into a working stroke and a wear stroke.

The working stroke is carried out during each brake operation in order to overcome the release play of the brake and compensate for the elasticities of the brake pads and of the caliper during the application of force.

In contrast, the wear stroke is the wear adjusting path, which the caliper carries out over a large number of brake operations, in order to compensate for the wear on the reaction side of the brake. The wear stroke is composed of the wear of the externally situated brake pad and of the externally situated brake disk friction surface and normally amounts to 20-25 millimeters, while the above-mentioned working stroke, and thus the sliding path for overcoming the release play, amounts to only a few millimeters.

If at least one adjusting device is arranged on each side of the brake disk, for example, in each case at least one or more electric-motor-driven adjusting rotating device(s) which move(s) pressure pieces in the direction of the brake pads, the distance between the brake pad and the brake disk can be adjusted on each side of the brake disk.

In such a case, it is necessary to still implement a displaceability of the brake disk for overcoming the release play and for compensating the elastic deformation of the brake pads and of the caliper, in accordance with the above-mentioned working stroke. Correspondingly, the slide bearing needs to have a displacement path however, a correspondingly clearly shorter one.

Although the use of such an adjusting system with at least one or more adjusting devices on each axial side of the brake disk already represents a considerable improvement, as a result of the still axial displaceability of the brake disk, a sliding guide can be implemented, although to a lesser extent. Thus, the frequent operation, typical of the use of a disk brake in a utility vehicle, because of the influencing forces, permanently leads to a wear of the sliding guide by which the brake disk is guided on the hub, resulting in sluggishness which requires corresponding maintenance work.

This is naturally has its costs, which are the result of the maintenance work as well as of the necessary interruptions in the operation of the vehicle.

It is therefore an object of the present invention to further develop the brake disk of the above-mentioned type such that a longer service life can be achieved by the use of constructively simple devices.

This object is achieved by providing a brake disk for a disk brake, particularly for a disk brake of a utility vehicle, having: a) two mutually connected friction rings, between which a ventilating gap is formed; b) a device for implementing an axial mobility of the friction rings relative to the wheel hub and/or wheel axle; and c) wherein the device for implementing the axial mobility of the friction rings is designed as a linking piece arranged on the friction rings and/or connected therewith, for the fastening of the brake disk to the wheel hub and/or wheel axle, which linking piece is constructed separately from the friction rings and can be elastically deformed relative to the friction rings.

Accordingly, the device for implementing the axial mobility of the friction rings is designed as a linking piece, which is arranged at the friction rings and/or is connected with them, for fastening the brake disk at the wheel hub and/or the wheel axle. The linking piece is constructed separately from the friction rings and can be elastically deformed relative to the friction rings.

As a result of this simple construction, an elastic linkage of the brake disk to the wheel hub and/or wheel axle is created, which advantageously does not require an axial displaceability or a bearing between the brake disk and the wheel hub and/or the wheel axle.

Since, to this extent, the brake disk is firmly but not rigidly linked with the hub, the wear parts required for an axial displacement are also eliminated. This results in a considerably lower susceptibility to disturbances so that maintenance and operating costs are correspondingly lowered with respect to the state of the art.

Preferably, the one-part or multi-part linking piece has a radial dimension relative to the wheel axle and is axially elastically deformable relative to the friction rings. Particularly preferably, the linking piece can be axially elastically deformed relative to the friction rings and the wheel axle in such a manner that, as a result of the elastic deformability, an axial mobility of the friction rings relative to the wheel axle is implemented, which axial mobility corresponds to the amount of the working stroke of a disk brake.

The brake disk is, therefore, suitable for, among others, fixed-caliper brakes which have adjusting devices on each side of the brake disk because, in the case of these types of brakes, only an axial deflectability of the brake disk must be ensured that is sufficient such that the working stroke is compensated. Optionally, in a supplementary manner, a low elastic deflectability of the caliper can be combined with the elastic deflectability of the brake disk according to the invention.

According to an advantageous further development of the invention, it is provided that the linking piece is arranged between the two friction rings and is fixedly connected with these, preferably in the outer circumferential area.

In order to obtain a sufficient elasticity, the linking piece, which consists of a springy material, preferably of a spring steel, is provided with recesses by which, depending on their shape and number, a defined restoring force can be reached or adjusted.

The linking piece is connected with the friction rings only in areas, or partially, and can otherwise be moved, that is, deflected with respect to these.

Otherwise, in the case of installation conditions of the brake disk having only a small distance between the inside diameter of the brake disk and the outside diameter of the hub, the invention is suitable for achieving a sufficiently large deflecting movement of the brake disk while the restoring forces are low. On the other hand, the elastic linkage permits the transmission of high braking torques of the brake disk to the hub.

By means of the arrangement of the linking piece in the ventilating duct formed between the two friction rings, a relatively large bending length of the linking piece can be achieved, whereby the linking piece can be sufficiently dimensioned for the transmission of the braking torque and the elastic linking piece does not impair the deflection of the brake disk and thus the function of the brake. Thus, an excessive deflecting resistance could result in an unequal stressing of the two brake disk sides, and thus cause an unequal wearing of the brake.

The linking piece may have many different constructions. One possibility consists of embedding, in the case of a composition casting method for producing the brake disk, the ring-shaped linking piece in a casting core, which is used for generating the ventilating duct of the brake disk. The casting core is constructed such that the casting material penetrates through exterior openings of the linking piece, so that, here, the linking piece is fastened to the two cast and mutually connected friction rings.

Furthermore, the linking piece consisting of a spring plate may be placed between the two friction rings, specifically such that, viewed in the cross-sectional direction, it is arranged approximately in the center of the ventilating duct, thus at the same distance from the respectively adjacent friction rings.

In this case, the linking piece is held in a radially secured manner in the linking areas in the exterior circumferential area between the two friction rings, these being mutually connected by riveting, screwing, welding or another connecting method.

For increasing the elasticity in the pressure direction of the brake disk, the linking piece may also be constructed as a lamellar body and consist of several thin, mutually stacked, individual metal sheets.

It is also contemplated for the linking piece to be produced of a plurality of individual ring segments which, in their respective common abutting areas, are provided with mutually corresponding profiles, whereby a simplification of the mounting and an optimized circumferential force transmission becomes possible.

Instead of many ring segments, which together result in a closed ring, the linking piece may also consist of a plurality of individual elements which each, on one side, are fastened in the circumferential area on the brake disk in the ventilating gap and, on the other side, are connected with the hub. In this case, the individual elements may be constructed and arranged in the manner of spokes and each consist of a spring steel which has a flat or round cross-section.

A brake disk for a disk brake, particularly for utility vehicles, is created which consists of two mutually spaced friction rings which thereby form a ventilating gap and are connected with one another, and which is non-rotatably connected to a wheel hub and/or wheel axle such that it is fastened by the use of a separate, radially extending linking piece to the hub so that it can be elastically deflected in the axial direction of the hub.

Additional advantageous further developments of the invention are described and claimed herein.

BRIEF DESCRIPTION OF THE DRAWINGS

Embodiments of the invention will be described in the following by means of the attached drawings.

DETAILED DESCRIPTION OF THE DRAWINGS

Figure 1:
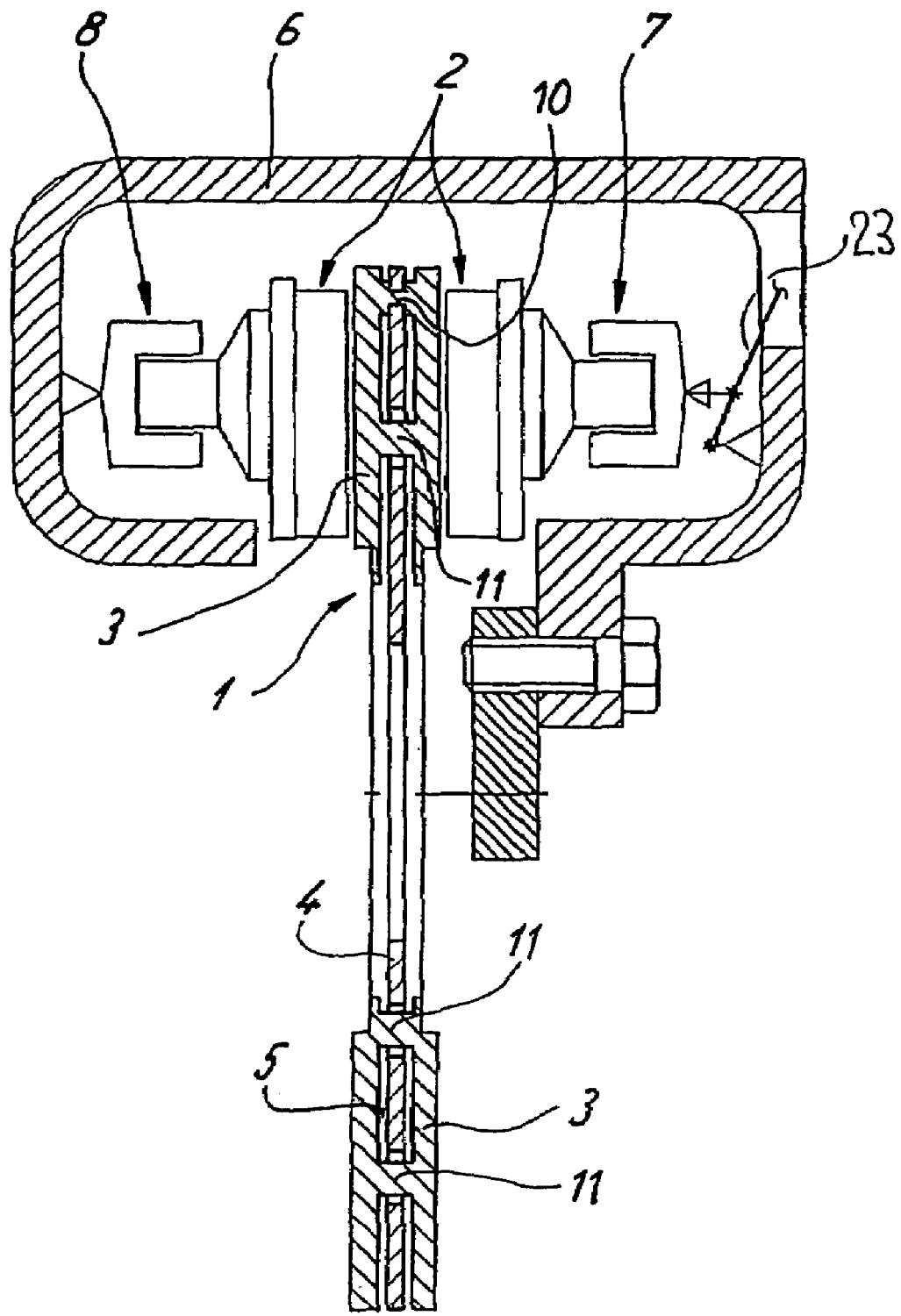
FIG. 1 is a cross-sectional view of a disk brake.

FIG. 1 illustrates a disk brake, particularly for utility vehicles, which has a caliper 6 constructed as a fixed caliper. The caliper 6 reaches around a brake disk 1 in its upper circumferential area. As illustrated, the brake disk 1 consists of two mutually spaced friction rings 3 which form a ventilating gap 5 between one another and are fixedly connected with one another.

On both axial sides of the brake disk 1, brake linings 2 are arranged, which can be adjusted or reset in the direction of the brake disk 1 for compensating wear.

Each brake lining 2 is provided with a brake pad which, in the case of an operation, contacts the brake disk 1. For this purpose, the brake lining, which is on the right in FIG. 1, is moved in the direction of the brake disk 1 by a brake application device having a rotary lever 23. Then, the brake disk 1 is displaced from the right brake lining 2 in the exterior area of the friction rings 3 of the brake disk 1 axially in the direction of the left brake lining 2, so that a frictional engagement is achieved between the two brake linings 2 and the brake disk 1. After braking, the right brake lining—for example, as a result of the effect of a restoring spring (which is not shown here) and the friction rings of the brake disk 1 return into the starting position.

For adjusting the brake linings 2 to account for the wear of the brake pads, each brake lining 2 is provided with at least one adjusting device 7, 8, by which the respective brake lining 2 is correspondingly applied in the direction of the brake disk 1.

A radially extending linking piece 4, which is fastened to the hub, is placed in the ventilating gap 5. The linking piece 4 is fastened, via fastening lugs 9 (FIGS. 2 and 3), in an elastically deflectable manner to the hub.

Figure 2:
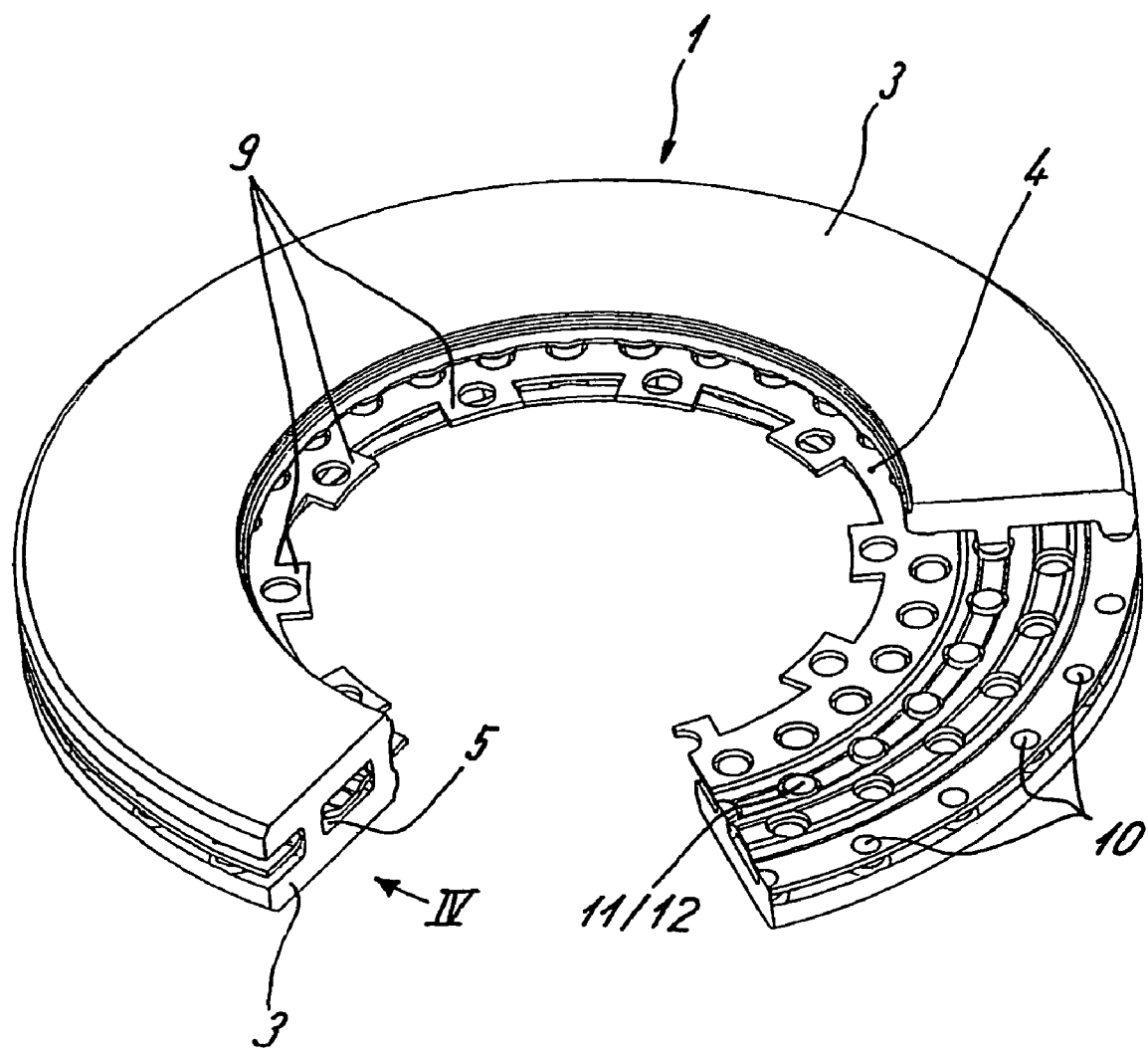
FIG. 2 is a partial sectional perspective view of a brake disk of the disk brake.

In the embodiment illustrated in FIG. 2, the linking piece 4 is formed of a one-piece ring, which is produced from spring plate and which is fastened through the use of webs 10 in the exterior circumferential area of the brake disk 1 to the friction rings 3 and is therefore radially fixed. The remaining surface area of the linking piece 4, which is largely covered by the friction rings 3, is axially movable in the ventilating gap 5 with respect to the friction rings 3.

In the case of the embodiment illustrated in FIG. 2, the linking piece 4 is immediately also cast-in as a casting when the brake disk 1 is produced. The linking piece 4 is embedded in a core, which core defines the space of the ventilating gap 5 and which is constructed such that, on the one hand, it permits the casting of the webs 10 through the correspondingly provided openings in the linking piece 4, whereby a form-locking connection is achieved between the brake disk 1 and the linking piece 4. And, on the other hand, the webs 11, which are constructed as pins and which are provided on mutually facing surfaces of the friction rings 3, are guided through openings 12 of the linking piece 4 such that, on the one hand, a firm connection is established between the two friction rings 3 and, on the other hand, a perfect axial mobility of the linking piece 4 becomes possible.

Figure 3:
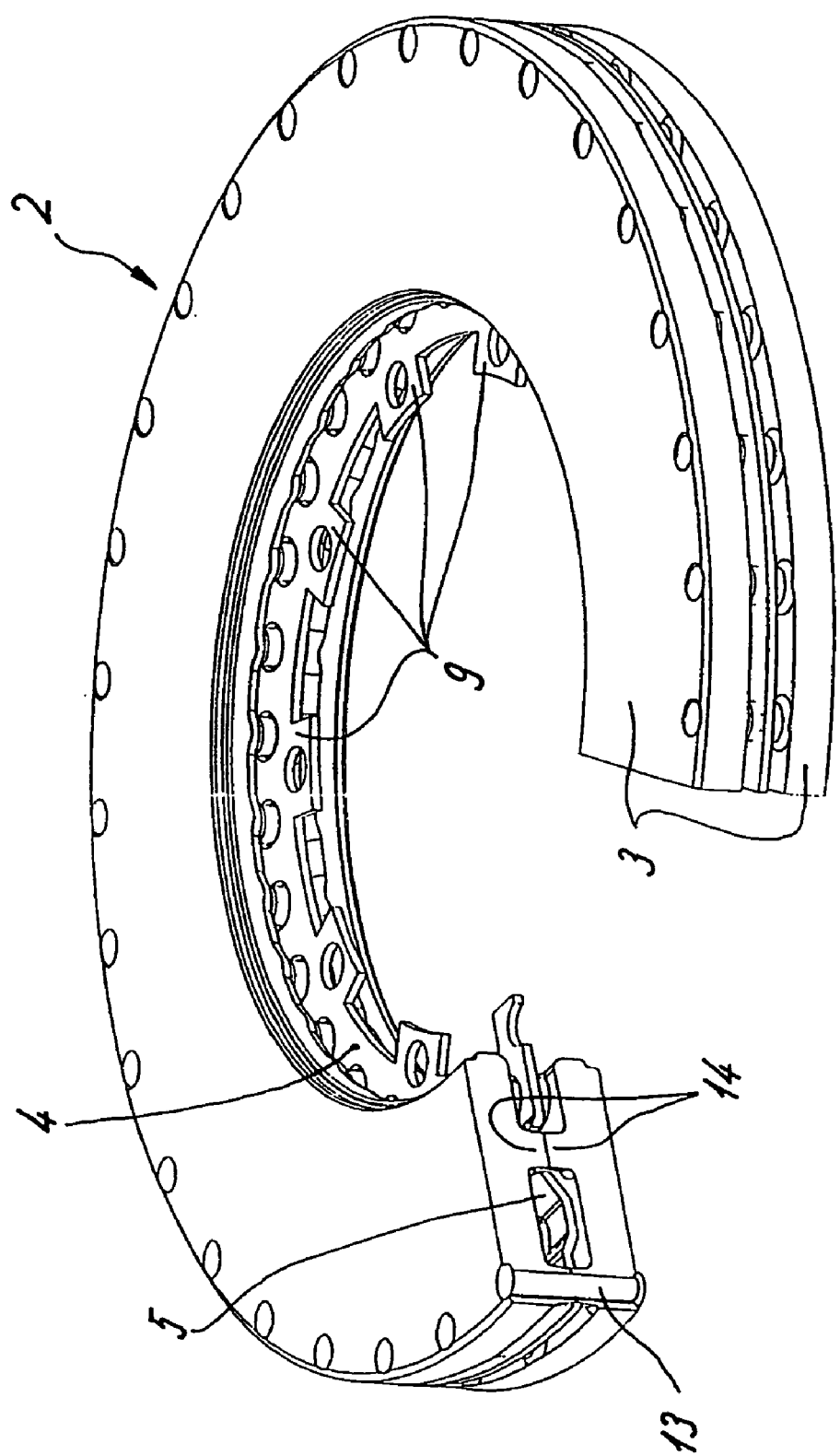
FIG. 3 is also a partial sectional perspective view of another embodiment of a disk brake.

In the embodiment illustrated in FIG. 3, the two friction rings 3 are constructed as separate parts and are connected with one another by riveting, for which rivet bolts 13 are provided in the outer edge are. The rivet bolts 13 pass through the friction rings 3 as well as through the linking piece 4. Like the cast webs 10, the rivet bolts 13 are narrowly guided in the corresponding openings of the linking piece 4.

In the remaining surface area of the friction rings 3, spacer pins 14 are provided on the mutually facing sides, which spacer pins 14 rest against one another and determine the height of the ventilating gap in which the linking piece is held in an axially deflectable manner. In this embodiment, as in the embodiment illustrated in FIG. 2, the diameters of the spacer pins 14 or of the webs 11 are smaller than the assigned diameter of the openings 12.

Figure 4:
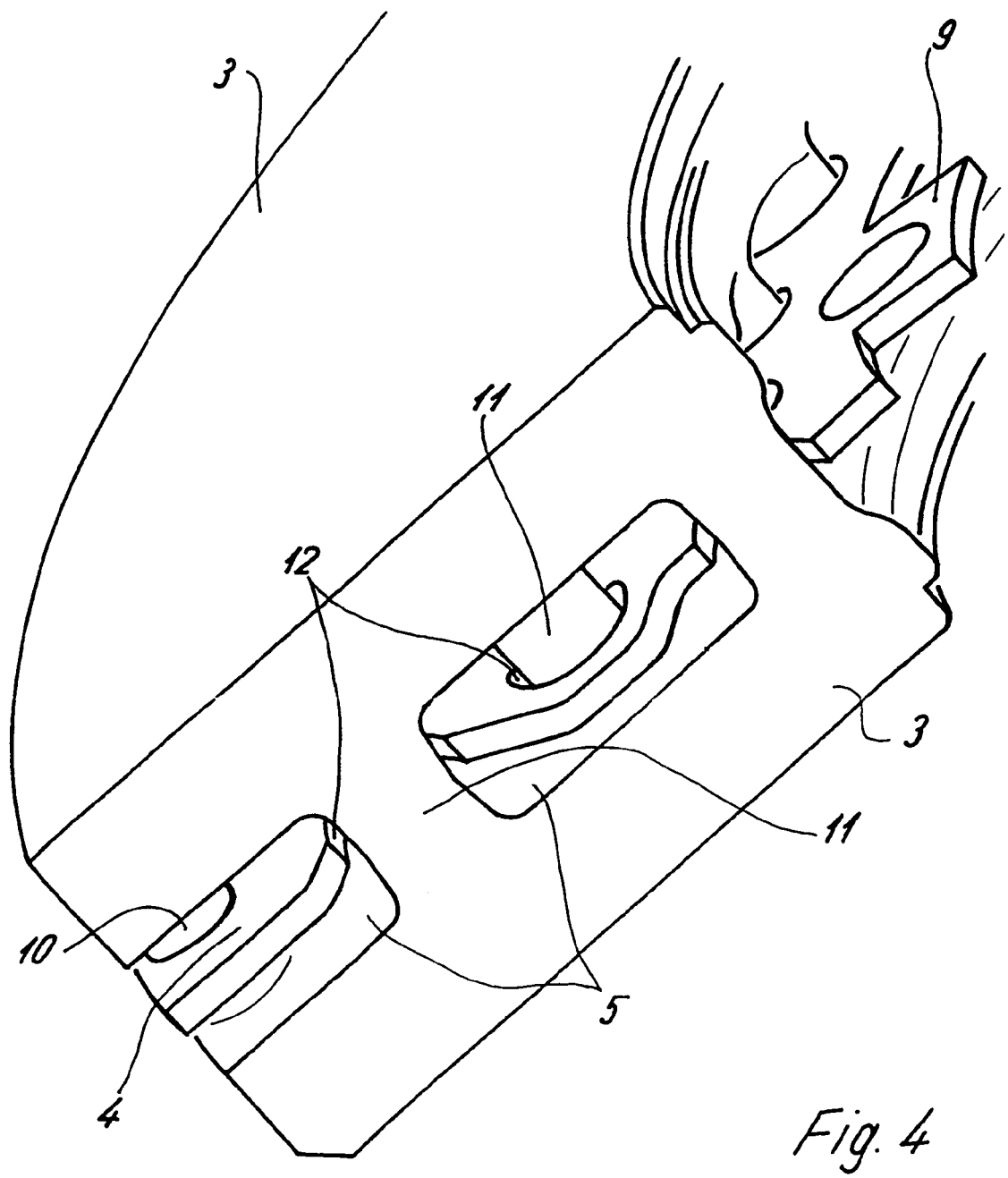
FIG. 4 is an enlarged view of the disk brake in the direction of the arrow IV in FIG. 2.

This is particularly clearly recognizable in FIG. 4, in which an enlarged sectional view of the embodiment of FIG. 2 is shown.

Figure 5:
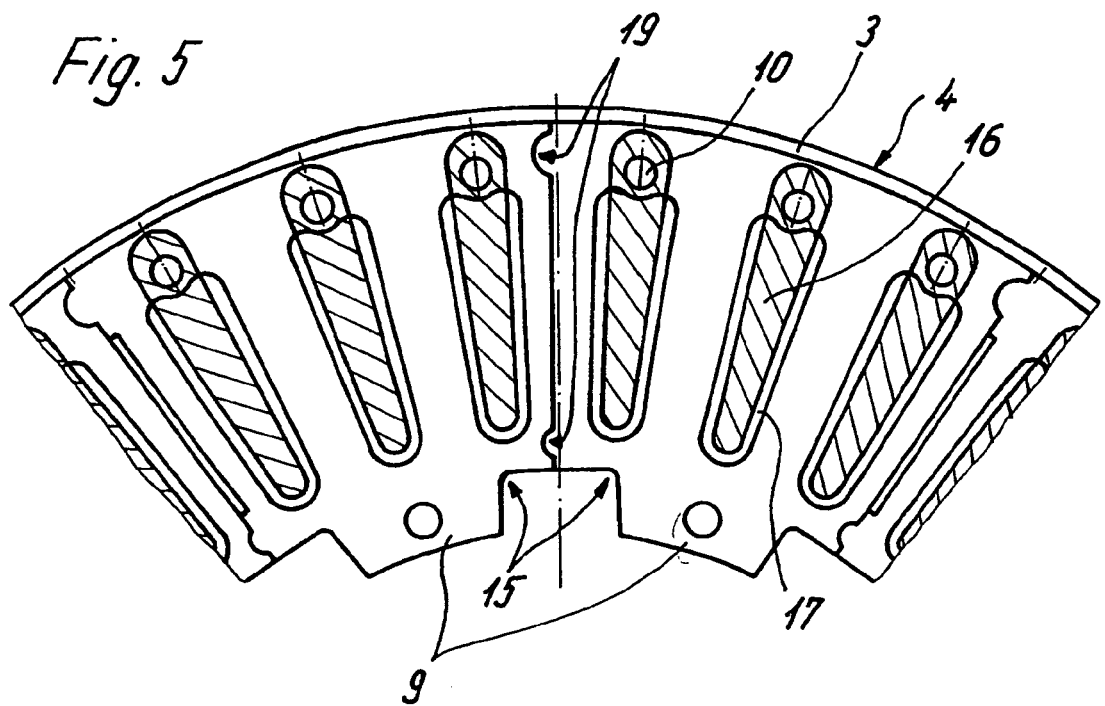
FIGS. 5 and 6 are sectional top views, respectively, of a disk brake.

While FIGS. 2 and 3 show the linking piece 4 as a one-piece ring, FIG. 5 shows an embodiment in which the linking piece 4 consists of a plurality of ring segments 15 which, on their mutually facing sides, are provided with mutually form-lockingly engaging profilings 19. Here, also the fastening of the ring segments 15 on the friction rings 3 takes place in the area of the webs 10 by which a radial, and if required, an axial fixing is achieved in the outer circumferential area of the brake disk 1.

For forming the ventilating gap, radially extending spacer ribs 16 are molded here onto the two friction rings 3 which, if they are produced as a casting, consist of one piece while, in the case of a separate manufacturing of the friction rings, they are provided on each friction ring 3 and rest against one another, as in the embodiment illustrated in FIG. 3.

The spacer ribs 16 are guided through recesses 17 of the ring segments 15. With respect to their contour, these recesses 17 correspond approximately to the contour of the assigned spacer rib 16, but are larger with respect to the dimensions of their surface areas, so that a free axial mobility of the linking piece 4 is ensured within the ventilating gap 5.

Figure 6:
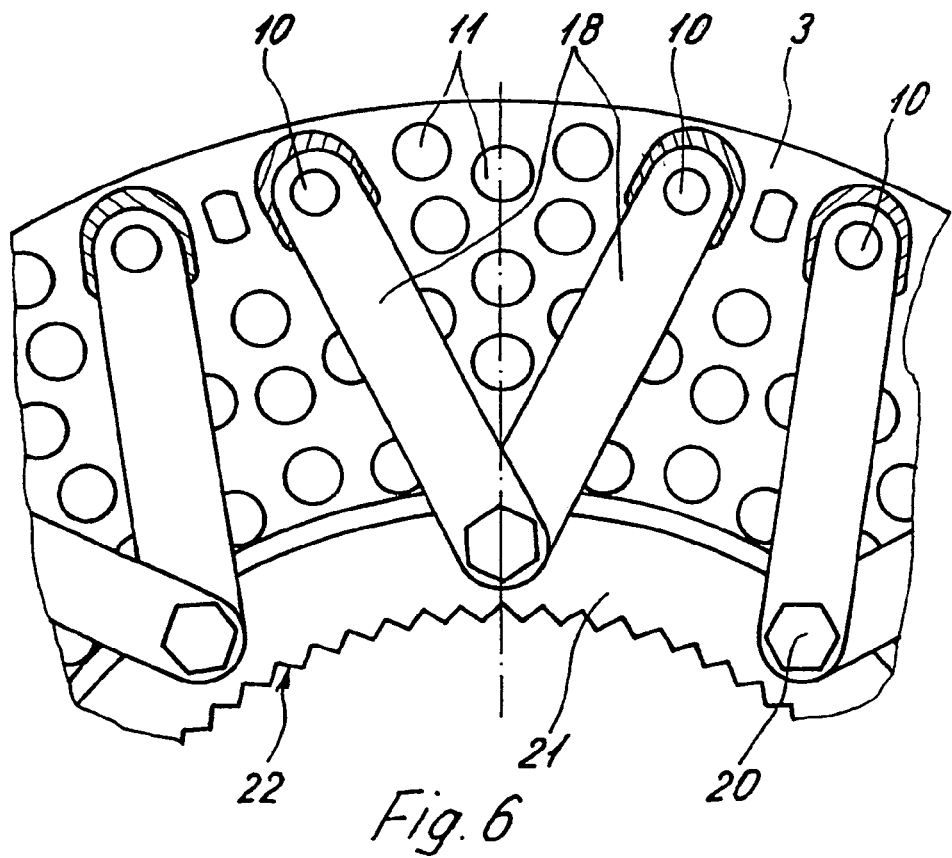

Another embodiment is illustrated in FIG. 6. In this case, the linking piece 4 consists of a plurality of spokes 18, which are formed of a spring steel and may have a different cross-section, for example, a round or rectangular cross-section, depending on the requirements.

The spokes 18 are in each case mounted in pairs and are arranged in a V-shape with respect to one another. Each spoke 18 is fastened in the outer edge area of the brake disk 1 on the friction rings 3, specifically also on the webs 10 or rivet bolts 13, as in the other illustrated embodiments.

On the opposite side, the two spokes 18 of each pair of spokes are jointly connected by way of a connection 20 with an interior ring 21 which has an internal toothing 22 which, for transmitting the braking torque, engages formlockingly in the wheel hub and/or wheel axle.

Here, webs 11 are also shown which are arranged outside the covering range of the spokes 18 and which mutually connect the two friction rings 3 while bridging the ventilating gap 5, or, as spacer pins 14, establish a spacing of the friction rings 3 for forming the ventilating gap 5.

TABLE OF REFERENCE NUMBERS 1 brake disk
2 brake lining
3 friction ring
4 linking piece
5 ventilating gap
6 caliper
7 adjusting device
8 adjusting device
9 fastening lug
10 webs
11 webs
12 opening
13 rivet bolt
14 spacer pin
15 ring segment
16 spacer rib
17 recess
18 spoke
19 profiling
20 connection
21 interior ring
22 toothing
23 rotary lever

The invention claimed is:

1. A brake disk for a disk brake, comprising:
two mutually connected friction rings, between opposing faces of which a ventilation gap is formed;
a linking piece constructed separately from the friction rings and adapted to fasten the brake disk to at least one of a wheel hub and a wheel axle, the linking piece being arranged in the ventilation gap in a radially fixed and axially deflectable manner allowing for axial mobility of the friction rings, and
wherein the linking piece is elastically deformable relative to the friction rings such that, as a result of the elastic deformability, the axial mobility of the friction rings relative to the wheel axle corresponds to an amount of a working stroke of the disk brake.

2. The brake disk according to claim 1, wherein the linking pieces has a radial dimension relative to the friction rings and is axially elastically deformable relative to the wheel axle.

3. The brake disk according to claim 1, wherein the linking piece is of a one-part construction.

4. The brake disk according to claim 1, wherein the linking piece is of a several part construction.

5. The brake disk according to claim 4, wherein the linking piece is formed of ring segments.

6. The brake disk according to claim 1, wherein the linking piece is made of a spring plate.

7. The brake disk according to claim 6, wherein the linking piece is fixedly connected in an exterior circumferential edge area of the friction rings.

8. The brake disk according to claim 6, wherein the linking piece has fastening lugs in a circumferential area which faces the wheel hub when in use, said fastening lugs being adapted to fasten the brake disk to the wheel hub.

9. The brake disk according to claim 1, wherein the linking piece is fixedly connected in an exterior circumferential edge area of the friction rings.

10. The brake disk according to claim 9, wherein the linking piece has fastening lugs in a circumferential area which faces the wheel hub when in use, said fastening lugs being adapted to fasten the brake disk to the wheel hub.

11. The brake disk according to claim 1, wherein the linking piece has fastening lugs in a circumferential area which faces the wheel hub when in use, said fastening lugs being adapted to fasten the brake disk to the wheel hub.

12. The brake disk according to claim 1, wherein the linking piece is partially covered by the friction rings.

13. The brake disk according to claim 1, wherein the linking piece has a ring-shaped construction.

14. The brake disk according to claim 1, wherein the linking piece is formed of ring segments.

15. The brake disk according to claim 14, wherein the ring segments have mutually formlockingly engaging profiles on respectively facing sides.

16. The brake disk according to claim 1, wherein the linking piece is constructed as a lamellar body formed of a plurality of stacked individual metal sheets.

17. The brake disk according to claim 1, wherein the linking piece is formed of a plurality of spokes.

18. The brake disk according to claim 17, wherein each two of said plurality of spokes are arranged as a pair situated in a V-shape with respect to one another and jointly fastened together in an area of the wheel hub.

19. The brake disk according to claim 1, wherein the friction rings are formed as a one-piece casting, and further wherein the linking piece is embedded in a core forming the ventilation gap before the one-piece casting.

20. The brake disk according to claim 1, wherein webs are circumferentially provided between the opposing surfaces of the friction rings, and wherein the linking piece is held in at least one of a radially and axially fixed manner via the webs.

21. The brake disk according to claim 1, wherein the friction rings are mutually connected via webs, the webs being guided through openings and/or recesses in the linking piece, which openings and/or recesses have contours corresponding to the assigned webs and, have dimensions larger than those of the assigned webs.

22. The brake disk according to claim 1, wherein the friction rings are riveted to one another in an outer circumferential area, and wherein the linking piece is radially fixed via rivet bolts.

23. The brake disk according to claim 1, wherein the brake disk is for a disk brake of a commercial vehicle.

24. A brake disk for use in a disk brake, the brake disk comprising:
  first and second friction rings spaced apart from one another to form a ventilation gap in between; and
  a link piece extending into the ventilation gap, the link piece being adapted to fasten the brake disk relative to a longitudinal axis of a wheel axle; and
  wherein the link piece is radially fixed in the ventilation gap in an axially deflectable manner, and is elastically deformable relative to the first and second friction rings to allow for an amount of axial movement of the friction rings with respect to the longitudinal axis corresponding to an amount of a working stroke of the disk brake.

25. The brake disk according to claim 24, wherein the link piece is a spring plate.

26. The brake disk according to claim 25, wherein the spring plate is formed in one-piece.

27. The brake disk according to claim 25, wherein the spring plate is formed in several pieces.

28. The brake disk according to claim 24, wherein the link piece is fixedly coupled in the ventilation gap at an exterior circumferential edge area of the first and second friction rings.

29. The brake disk according to claim 24, wherein the link piece comprises a plurality of spokes.

30. The brake disk according to claim 29, wherein each pair of spokes are configured in a V-shape such that free ends thereof extend into the ventilation gap and are secured in an outer circumferential edge area of the first and second friction rings, whereas coupled ends thereof are adapted to be fastened in an area of the longitudinal axis of the wheel axle.

31. The brake disk according to claim 24, wherein the link piece is held in a radially and/or axially fixed manner via webs spanning the ventilation gap between the first and second friction rings.

32. The brake disk according to claim 31, wherein said webs are guided through openings in the link piece, which openings are contoured to correspond with contours of the web and are dimensioned so as to be larger than dimensions of the webs.

33. A linkage structure for coupling a brake disk, having a ventilation gap formed between first and second friction rings, relative to at least one of a wheel hub and wheel axle so as to be axially movable relative to a longitudinal axis of the wheel hub and/or wheel axle, the linkage structure comprising:
  a ring-shaped plate having inner and outer circumferential edges;
  wherein the outer circumferential edge is adapted to be fixed radially with respect to the brake disk in an outer circumferential area of the brake disk; and
  wherein in an inner circumferential edge the ring-shaped plate has arranged thereon fastening lugs adapted for the wheel hub; and
  wherein the ring-shaped plate is elastically deformable relative to the brake disk to allow for an amount of the axial movement of the brake disk corresponding to an amount of a working stroke of the disk brake.

34. The linkage structure according to claim 33, wherein the ring-shaped plate is a spring plate.

35. The linkage structure according to claim 34, wherein the spring plate is formed in one-piece.

36. The linkage structure according to claim 34, wherein the spring plate is formed in several pieces.

37. The linkage structure according to claim 33, wherein side surfaces of the ring-shaped plate include openings through which interior webs of the brake disk pass, said openings being contoured to correspond with that of the webs and being dimensioned slightly larger than that of the webs.

* * * * *